(12) United States Patent
Keppeler (10) Patent No.: US 9,938,389 B2
(45) Date of Patent: Apr. 10, 2018

(54) METHOD FOR PRODUCTION EXPANDED POLYESTER FOAM PARTICLES

(71) Applicant: BASF SE, Ludwigshafen (DE)

(72) Inventor: Uwe Keppeler, Hochdorf-Assenheim (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/028,357

(22) PCT Filed: Sep. 29, 2014

(86) PCT No.: PCT/EP2014/070728
§ 371 (c)(1),
(2) Date: Apr. 8, 2016

(87) PCT Pub. No.: WO2015/052020
PCT Pub. Date: Apr. 16, 2015

(65) Prior Publication Data
US 2016/0244584 A1 Aug. 25, 2016

(30) Foreign Application Priority Data
Oct. 9, 2013 (EP) .................................... 13187895

(51) Int. Cl.
| | | |
|---|---|---|
| C08J 9/18 | (2006.01) | |
| C08J 9/20 | (2006.01) | |
| B29C 44/34 | (2006.01) | |
| C08J 9/00 | (2006.01) | |
| C08J 9/12 | (2006.01) | |
| C08J 9/14 | (2006.01) | |
| C08J 9/232 | (2006.01) | |
| C08J 9/236 | (2006.01) | |
| C08J 9/228 | (2006.01) | |

(52) U.S. Cl.
CPC ............ *C08J 9/18* (2013.01); *B29C 44/3453* (2013.01); *B29C 44/3461* (2013.01); *C08J 9/0061* (2013.01); *C08J 9/0066* (2013.01); *C08J 9/122* (2013.01); *C08J 9/141* (2013.01); *C08J 9/228* (2013.01); *C08J 9/232* (2013.01); *C08J 9/236* (2013.01); *C08J 2201/034* (2013.01); *C08J 2203/06* (2013.01); *C08J 2203/14* (2013.01); *C08J 2203/182* (2013.01); *C08J 2205/052* (2013.01); *C08J 2300/16* (2013.01); *C08J 2367/02* (2013.01); *C08J 2467/04* (2013.01)

(58) Field of Classification Search
CPC ...................................... C08J 9/18; C08J 9/20
See application file for complete search history.

(56) References Cited

U.S. PATENT DOCUMENTS

| | | | |
|---|---|---|---|
| 5,817,721 A * | 10/1998 | Warzelhan | ............. C08G 63/91 525/437 |
| 5,863,991 A | 1/1999 | Warzelhan et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,046,248 A | 4/2000 | Warzelhan et al. | |
| 6,111,058 A | 8/2000 | Warzelhan et al. | |
| 6,120,895 A | 9/2000 | Kowitz et al. | |
| 6,258,924 B1 | 7/2001 | Warzelhan et al. | |
| 6,353,084 B1 | 3/2002 | Warzelhan et al. | |
| 6,458,858 B1 * | 10/2002 | Braun | ........................ C08J 9/18 521/138 |
| 9,206,311 B2 | 12/2015 | Steinke et al. | |

FOREIGN PATENT DOCUMENTS

| | | |
|---|---|---|
| DE | 25 42 453 A1 | 4/1977 |
| EP | 0 072 499 A1 | 2/1983 |
| EP | 1275687 A2 | 1/2003 |
| EP | 1 514 896 A1 | 3/2005 |
| EP | 1 533 335 A1 | 5/2005 |
| EP | 2336225 A1 | 6/2011 |
| JP | 2004143269 A | 5/2004 |
| WO | WO-92/09654 A2 | 6/1992 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-96/21689 A2 | 7/1996 |

(Continued)

OTHER PUBLICATIONS

International Search Report for PCT/EP2014/070728 dated Nov. 5, 2014.

(Continued)

*Primary Examiner* — Kara B Boyle
(74) *Attorney, Agent, or Firm* — Drinker Biddle & Reath LLP (57) ABSTRACT

A process for producing expanded foam beads from pellets comprising at least one biodegradable polyester. The process comprises
(i) producing a suspension comprising pellets in an aqueous suspension medium,
(ii) impregnating the pellets present in the suspension from step (i) with at least one physical blowing agent by heating the pellet suspension to a depressurization temperature IMT, with stirring, to provide pellets laden with blowing agent in the suspension medium, and
(iii) depressurizing the suspension obtained in step (ii) and cooling the depressurized suspension with a liquid aqueous coolant, in order to obtain the expanded foam beads.

The blowing agent can be added in step I, or in step ii during the heating phase or following the heating phase. Following the heating phase, the suspension is maintained at a temperature in the range from IMT minus 5° C. to IMT plus 2° C. for 3 to 100 minutes, and the ratio of aqueous coolant to suspension medium is at least 0.3. The invention further relates to expanded foam beads obtained by the process and to moldings that are produced from the expanded foam beads.

5 Claims, 1 Drawing Sheet

(56) References Cited

FOREIGN PATENT DOCUMENTS

| WO | WO-9621690 A1 | 7/1996 |
|---|---|---|
| WO | WO-9621691 A1 | 7/1996 |
| WO | WO-9621692 A1 | 7/1996 |
| WO | WO-96/2446 A1 | 8/1996 |
| WO | WO-96/25448 A1 | 8/1996 |
| WO | WO-9812242 A1 | 3/1998 |
| WO | WO-00/68303 A1 | 11/2000 |
| WO | WO-2006/097353 A1 | 9/2006 |
| WO | WO-2006/097354 A1 | 9/2006 |
| WO | WO-2010034689 A1 | 4/2010 |
| WO | WO-2012/020112 A1 | 2/2012 |

OTHER PUBLICATIONS

International Preliminary Examination Report for for PCT/EP2014/070728 dated Dec. 9, 2015.

* cited by examiner

METHOD FOR PRODUCTION EXPANDED POLYESTER FOAM PARTICLES

CROSS-REFERENCE TO RELATED APPLICATIONS

This application is a national stage application (under 35 U.S.C. § 371) of PCT/EP2014/070728, filed Sep. 29, 2014, which claims benefit of European Application No. 13187895.1, filed Oct. 9, 2013, both applications of which are incorporated herein by reference in their entirety.

The invention relates to a process for producing expanded foam beads from pellets comprising at least one biodegradable polyester obtainable by polycondensation from:
- A1) 40 to 60 mol %, based on components A1) to A2), of a succinic acid, adipic acid, azelaic acid, sebacic acid, brassylic acid or the respective ester-forming derivatives or mixtures thereof,
- A2) 40 to 60 mol %, based on components A1) to A2), of a terephthalic acid or the ester-forming derivative thereof,
- B) 98.5 to 100 mol %, based on components A1) to A2), of 1,4-butanediol or 1,3-propanediol or a mixture thereof; and
- C) 0.05% to 1.5% by weight, based on components A1) to A2) and B, of one or more compounds selected from the group consisting of:
  - C1) a compound having at least three groups capable of ester formation,
  - C2) a di- or polyfunctional isocyanate,
  - C3) a di- or polyfunctional epoxide;

comprising the following steps:
- (i) producing a suspension comprising pellets in a suspension medium,
- (ii) impregnating the pellets present in the suspension from step (i) with at least one physical blowing agent, in order to obtain pellets laden with blowing agent in suspension, by heating the mixture to the depressurization temperature IMT, with stirring, and
- (iii) depressurizing the suspension obtained in step (ii) after expiry of the retention time and cooling the depressurized suspension with a liquid aqueous coolant, in order to obtain expanded foam beads, which comprises proceeding in an aqueous suspension medium, adding the blowing agent in step i or in step ii during the heating phase or immediately after the heating phase, and in step (ii), after heating, keeping the suspension at a temperature in the range from IMT minus 5° C. to IMT plus 2° C. for 3 to 100 minutes, and wherein the ratio of coolant to suspension medium is at least 0.3.

The invention further relates to expanded foam beads obtainable by this process, to the production of moldings from these foam beads and to the use of these moldings for a covering for stall floors or sports floors, for body protectors, for protective cushioning in bicycle helmets, for trim elements in automobile construction, for sound and vibration deadeners, for packaging or shoe soles.

BACKGROUND OF THE INVENTION

Plastics foams are synthetically produced materials with cell structure throughout their entire volume, with a density lower than that of the compact material from which they were produced. Their importance as lightweight construction material is constantly increasing, because they often have an unusual combination of mechanical properties with low densities. Thermal conductivity values are often very low, and therefore some foams have considerable importance as insulation material.

The disposal of plastics foams after use thereof is sometimes problematic. Another possibility often also available alongside energy recycling is materials recycling. However, biodegradability by way of example in a composting system would be desirable.

Polyester-based foams are known from various publications. These foams are usually produced by an extrusion process.

Said process has the disadvantage that it can generally produce only simple shapes such as blocks, sheets, and thin layers (foam foils). There is also often a restriction on the maximum thickness of blocks that can be produced by this process.

In contrast, moldings of almost any desired geometry can be produced by using foam beads. WO 2012/020112 describes by way of example the production of expandable polyester-based beads and foam beads obtainable therefrom by use of an extrusion process. However, the mechanical properties of moldings produced therefrom are not always suitable for applications which require high tensile strengths and high tensile strain at break.

These problems can be avoided by using what is known as the autoclave process as described by way of example in Ullmann's Encyclopedia of Industrial Chemistry, vol. A11 1988. The range of requirements placed upon the foam beads thus produced and the moldings resulting therefrom can differ greatly, depending on application sector. However, it is possible to define common minimum requirements for the suitability of the process for various materials.

These are:
- The capability to produce foam beads over a wide range of bulk density, and in particular here it should be possible to achieve a very low bulk density irrespective of bead geometry and size. A low weight of the resultant moldings leads to cost savings.
- Foam beads with predominantly closed-cell foam structure. This leads to good processibility in commercially available molding machines using the pressure-fill method, and to low water absorption.
- Complete impregnation of the polymer beads to give foam beads without compact core. (No impairment of mechanical properties or of tactile properties of the resultant moldings.)

Numerous parameters can be varied in the autoclave process in order to comply with these requirements. These are inter alia the suspension medium, the type of blowing agent and concentration thereof, the heating curve, and the impregnation temperature (IMT). It is not generally possible here to take a parameter, or parameter combination, that is particularly suitable for one material and use it for another material.

WO 00/68303 describes in general terms the production of expanded polymer beads based on biodegradable saturated polyesters in an autoclave process. Suspension medium preferably used here is ethylene glycol and glycerol with a density of from 1.1 to 1.25 g/cm³. These processes are not always entirely satisfactory in respect of the procedure, the capability of the process, and the property profile of the expanded foam beads thus obtainable.

JP 2004 143269 discloses an autoclave process which foams micropellets made from the biodegradable polyesters defined at the outset; the advantageous cooling of suspension medium by adding a coolant is not described in JP 2004 143269. With regard to the batch homogeneity, the surface properties of the foam beads and the associated bead gloss, the process known from JP 2004 143269 is unsatisfactory. Furthermore, the foam beads obtainable from micropellets and the moldings obtainable therefrom have unsatisfactory rebound.

DETAILED DESCRIPTION OF THE INVENTION

We have now found an upscalable autoclave process for production of expanded foam beads from pellets comprising at least one biodegradable polyester obtainable by polycondensation from:
  A1) 40 to 60 mol %, based on components A1) to A2), of a succinic acid, adipic acid, azelaic acid, sebacic acid, brassylic acid or the respective ester-forming derivatives or mixtures thereof,
  A2) 40 to 60 mol %, based on components A1) to A2), of a terephthalic acid or the ester-forming derivative thereof,
  B) 98.5 to 100 mol %, based on components A1) to A2), of 1,4-butanediol or 1,3-propanediol or a mixture thereof; and
  C) 0.05% to 1.5% by weight, based on components A1) to A2) and B, of one or more compounds selected from the group consisting of:
    C1) a compound having at least three groups capable of ester formation,
    C2) a di- or polyfunctional isocyanate,
    C3) a di- or polyfunctional epoxide;
comprising the following steps:
  (i) producing a suspension comprising pellets in a suspension medium,
  (ii) impregnating the pellets present in the suspension from step (i) with at least one physical blowing agent, in order to obtain pellets laden with blowing agent in suspension, by heating the mixture to the depressurization temperature IMT, with stirring, and
  (iii) depressurizing the suspension obtained in step (ii) after expiry of the retention time and cooling the depressurized suspension with a liquid aqueous coolant, in order to obtain expanded foam beads,
which comprises proceeding in an aqueous suspension medium, adding the blowing agent in step i or in step ii during the heating phase or immediately after the heating phase, and in step (ii), after heating, keeping the suspension at a temperature in the range from IMT minus 5° C. to IMT plus 2° C. for 3 to 100 minutes, and wherein the ratio of coolant to suspension medium is at least 0.3.

With this process, it is possible to upscale, without the problems described above, production of expanded foam beads which meet the above-described minimum demands. The foam beads can be processed in a surprisingly simple manner to give moldings having excellent mechanical properties in respect of tensile strength, tensile strain at break, rebound, and compression set.

The invention is described in detail below.

The process of the invention for production of expanded foam beads uses pellets comprising the biodegradable polyesters mentioned at the outset.

The biodegradable polyesters based on aliphatic and aromatic dicarboxylic acids, and on aliphatic dihydroxy compounds are also termed semiaromatic polyesters. All of these polyesters are biodegradable in accordance with DIN EN 13432. It is also possible, of course, to use mixtures of a plurality of polyesters of this type.

The expression semiaromatic (aliphatic-aromatic) polyesters is intended in the invention to include polyester derivatives which comprise up to 10 mol % of functions other than ester functions, examples being polyetheresters, polyesteramides or polyetheresteramides, and polyesterurethanes. Among the suitable semiaromatic polyesters are linear polyesters that have not been chain-extended (WO 92/09654). Preference is given to chain-extended and/or branched semiaromatic polyesters. The latter are known from the following documents cited at the outset: WO 96/15173 to 15176, 21689 to 21692, 25446, 25448, or WO 98/12242, which are expressly incorporated herein by way of reference. It is equally possible to use mixtures of various semiaromatic polyesters. More recent developments of interest are based on renewable raw materials (see WO-A 2006/097353, WO-A 2006/097354, and WO2010/034689). The expression semiaromatic polyesters in particular means products such as ecoflex® (BASF SE) and Enpol® (Ire Chemicals).

The preferred semiaromatic polyesters include polyesters comprising, as essential components:
  A1) 40 to 60 mol %, preferably 52 to 58 mol %, based on components A1) to A2), of a succinic acid, adipic acid, azelaic acid, sebacic acid, brassylic acid or the respective ester-forming derivatives or mixtures or mixtures thereof, especially preferably a succinic acid, adipic acid or sebacic acid,
  A2) 40 to 60 mol %, preferably 42 to 48 mol %, based on components A1) to A2), of terephthalic acid or the ester-forming derivative thereof,
  B) 98.5 to 100 mol %, based on components A1) to A2), of 1,4-butanediol or 1,3-propanediol or a mixture thereof; and
  C) 0.05% to 1.5% by weight, based on components A1) to A2) and B, of one or more compounds selected from the group consisting of:
    C1) a compound having at least three groups capable of ester formation, preferably glycerol or pentaerythritol,
    C2) a di- or polyfunctional isocyanate, preferably hexamethylene diisocyanate;
    C3) a di- or polyfunctional epoxide, preferably a copolymer of styrene, (meth)acrylic acid and glycidylmethacrylic acid.

Components A1 used are succinic acid, adipic acid, azelaic acid, sebacic acid, brassylic acid, or respective ester-forming derivatives thereof, or a mixture thereof. It is particularly preferable to use succinic acid, adipic acid, or sebacic acid, or respective ester-forming derivatives thereof, or a mixture thereof. Succinic acid, azelaic acid, sebacic acid, and brassylic acid moreover have the advantage that they are obtainable from renewable raw materials.

Particular preference is given to the following aliphatic-aromatic polyesters: polybutylene adipate terephthalate (PBAT), polybutylene sebacate terephthalate (PBSeT), and polybutylene succinate terephthalate (PBST), and very particular preference is given to polybutylene adipate terephthalate (PBAT) and polybutylene sebacate terephthalate (PBSeT).

The aromatic dicarboxylic acids or ester-forming derivatives thereof A2 can be used individually or in the form of a mixture made of two or more thereof. It is particularly preferable to use terephthalic acid or ester-forming derivatives thereof, for example dimethyl terephthalate. Components B used are 1,4-butanediol and 1,3-propanediol. The latter moreover have the advantage that they are obtainable in the form of renewable raw material. It is also possible to use mixtures.

Use is generally made of from 0.01% to 2% by weight, preferably from 0.05% to 1.5% by weight, and with particular preference from 0.1% to 0.3% by weight, based on the total weight of the polyester, of a branching agent (C1), and/or of from 0.1% to 1.5% by weight, based on the total weight of the polyester, of a chain extender (C2 or C3). The branching agent is preferably an at least trihydric alcohol, or an at least tribasic carboxylic acid. Particular chain extenders that can be used are difunctional isocyanates or epoxides.

Particularly preferred branching agents C1 have 3 to 6 functional groups. The following may be mentioned by way of example: tartaric acid, citric acid, malic acid; trimethylolpropane, trimethylolethane; pentaerythritol; polyethertriols and glycerol, trimesic acid, trimellitic acid, trimellitic anhydride, pyromellitic acid, and pyromellitic dianhydride. Preference is given to polyols such as trimethylolpropane, pentaerythritol, and in particular glycerol. By using component C it is possible to construct biodegradable polyesters having pseudoplasticity. The biodegradable polyesters have better processibility.

Chain extenders (C2 or C3) used, which may also be regarded as long-chain branching agents, are especially hexamethylene diisocyanate or a copolymer of styrene, (meth)acrylic acid and glycidylmethacrylic acid.

The number-average molar mass (Mn) of the polyesters is generally in the range from 5000 to 100 000 g/mol, in particular in the range from 10 000 to 75 000 g/mol, preferably in the range from 15 000 to 38 000 g/mol, their weight-average molar mass (Mw) being from 30 000 to 300 000 g/mol, preferably from 60 000 to 200 000 g/mol, and their Mw/Mn ratio being from 1 to 6, preferably from 2 to 4. Intrinsic viscosity is from 50 to 450 g/mL, preferably from 80 to 250 g/mL (measured in o-dichlorobenzene/phenol (ratio by weight 50/50)). Melting point is in the range from 85 to 150° C., preferably in the range from 95 to 140° C.

The preferred semiaromatic polyesters are characterized by a molar mass (Mn) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

MVR (melt volume rate) in accordance with EN ISO 1133 (190° C., 2.16 kg weight) is generally from 0.1 to 70 cm$^3$/10 min, preferably from 0.8 to 70 cm$^3$/10 min, and in particular from 1 to 60 cm$^3$/10 min.

Acid numbers in accordance with DIN EN 12634 are generally from 0.01 to 1.2 mg KOH/g, preferably from 0.01 to 1.0 mg KOH/g, and with particular preference from 0.01 to 0.7 mg KOH/g.

The individual steps (i) to (iii) of the process of the invention are described in detail below.

Step (i) of the process of the invention comprises the producing of a suspension comprising pellets of the above-described polyester in a suspension medium.

Step (i) of the process of the invention uses the polyester in the form of pellets. The process permits the use of a wide range of different particle sizes and therefore also particle weights. However, the mean particle size (mean particle weight) is one of the decisive parameters that influence the selection of the correct production parameters. The particle weight determines the weight, and influences the size, of the expanded foam beads.

The mean particle weight is determined as the arithmetic mean by weighing 3×10 beads.

The polyester pellets may have average diameters of 1 to 6 mm, especially of 2 to 5 mm, more preferably 3 mm to 4.5 mm.

These preferably cylindrical or round pellets can be produced by any compounding methods known to those skilled in the art with subsequent pelletization in the form of cold or hot chopping. For example by compounding the polyester, optionally together with further additives in a twin-screw extruder, expression from the extruder, optionally cooling and pelletizing. Corresponding methods are described, for example, in Kunststoff Taschenbuch, Hauser-Verlag, 28th edition, 2001.

The individual beads of such a pelletized material generally have a weight of 0.5 to 100 mg/bead. According to the application, different particle sizes and bulk densities of the foam beads are preferred. We have now found that, for applications requiring a higher rebound, for example shoe soles of sports shoes or coverings of sports floors, particularly suitable foam beads are those having a mean particle weight of 10 to 60 g/bead and more preferably 21 to 50 mg/bead. Moldings produced from these foam beads generally have a rebound measured in accordance with DIN EN ISO 8307 of Jan. 1, 2008 of 50% to 80% and preferably 60% to 75%. If, however, foam beads are produced by the process described in JP 2004 143269, the moldings produced therefrom will have a distinctly lower rebound.

The pellets preferably used in step (i) of the process of the invention can optionally comprise other additives.

These can by way of example be nucleating agents which can influence the type of cell. Quantities generally used of these are from 0.001% to 10.0%, based on the pellets, preferably from 0.01% to 1.0%, very particularly preferably from 0.02% to 0.2%. Examples of suitable materials are talc powder, paraffins and/or waxes, and also carbon black, graphite, and fumed silicas, and moreover natural or synthetic zeolites and, optionally modified, bentonites, particular preference being given to talc powder.

The pellets preferably used in step (i) can moreover comprise conventional additional substances such as antioxidants, stabilizers, flame retardants, waxes, fillers, pigments, and dyes. Suitable additives are known per se to the person skilled in the art and are listed by way of example in EP 1 514 896 A1.

In step (i) of the process of the invention the pellets are suspended in a suitable suspension medium. In general it is possible to use any of the suspension media known to the person skilled in the art to be suitable, where these ensure that the pellets used do not dissolve therein. Examples of particularly suitable water-containing suspension media in the invention are water, and mixtures of water with from 5 to 50% by weight, based on the mixture, of a polar organic solvent, for example methanol, ethanol, propanols such as isopropanol, glycerol, ethylene glycol, or ketones such as acetone, or a mixture of the organic solvents. In order to obtain a suspension of the pellets with maximum homogeneity with minimum use of agitation resource, WO00/68303 gave preference to selection of a suspension medium of density comparable with that of the pellets—i.e. densities from 1.1 to 1.3 kg/m$^3$. WO 00/68303 therefore recommends use of liquids such as ethylene glycol and glycerol with densities of from 1.1 to 1.3 kg/m$^3$ as suspension medium. Substances such as ethylene glycol are, however, hazardous to health and above the flashpoint form flammable vapor-air mixtures. Surprisingly, it has now been found that step (i) of the process of the invention can use an aqueous mixture or preferably water as suspension medium which does not have the abovementioned disadvantages.

The quantity of suspension medium in the suspension is generally selected in such a way that the phase ratio of pellets used in step (i) to suspension medium is >0.2, preferably >0.25. The phase ratio of pellets used in step (i) to suspension medium is generally <1.20, preferably <1.00, particularly preferably <0.80.

The phase ratio of the invention relates to the ratio of pellets, measured in kilograms, to suspension medium, likewise in kilograms. The person skilled in the art is aware of methods for adjusting the ratio of the invention, and by way of example 500 kg of pellets in 1000 kg of water gives a pellets:water phase ratio of 0.5.

The quantity of pellets introduced into the suspension according to step (i) is calculated from the pellets:suspension medium phase ratio described above.

It is preferable that the pellets are suspended in water in a stirred reactor. It is preferable here to use at least one suspension aid in order to ensure uniform distribution of the pellets in the suspension medium.

Suitable suspension aids are water-insoluble inorganic stabilizers, for example tricalcium phosphate, magnesium pyrophosphate, metal carbonates, such as particularly calcium carbonate, and moreover polyvinyl alcohol, and surfactants. The quantities used of these suspension aids, in particular the water-insoluble inorganic stabilizers mentioned, are usually from 0.005% to 10% by weight, based on the entire suspension. The quantity used of ionic surfactants, for example sodium dodecylarylsulfonate, or of nonionic surfactants, for example fatty alcohol ethoxylates as described by way of example in "Ullmann's Encyclopedia of Industrial Chemistry, sixth edition, topic: Surfactants", is usually from 2 to 2000 ppm, in particular from 2 to 500 ppm, based on the entire suspension. It is usual to use a water-insoluble compound in combination with a surface-active substance (surfactant). However, it is also possible to carry out the process of the invention without any water-insoluble inorganic stabilizer.

Step (i) of the process of the invention can be carried out at any of the suitable temperatures. These temperatures are known to the person skilled in the art, and by way of example step (i) of the process of the invention is generally carried out at a temperature at which the suspension medium used is liquid, for example at a temperature of from 15 to 35° C., particularly preferably at ambient temperature.

Step (ii) of the process of the invention comprises the impregnation of the pellets comprised in the suspension from step (i) with at least one blowing agent, in order to obtain pellets laden with blowing agent in suspension.

Operations in step (ii) of the process of the invention are by way of example carried out in an impregnation vessel, e.g. in a stirred-tank reactor. The suspension from step (i) of the process of the invention is generally present in the reactor, for example in an impregnation tank, preferably taking the form of mini pellets in water as suspension medium, optionally with a suspension aid. At least one blowing agent is then preferably metered into said suspension.

It is generally possible to use any of the blowing agents known to the person skilled in the art. The boiling point of the blowing agent is generally from −25 to 150° C. at atmospheric pressure, in particular from −10 to 125° C.

The blowing agent is preferably a linear or cyclic aliphatic hydrocarbon, for example methane, ethane, n-propane, isopropane, n-butane, isobutane, pentanes, cyclopentane, hexanes, and heptanes, halogenated hydrocarbons, for example dichlorodifluoromethane, trichloromonofluoromethane, an alcohol, for example methanol, ethanol, n-propanol, isopropanol, and n-butanol, a ketone, for example 3,3-dimethyl-2-butanone and 4-methyl-2-pentanone, an ether, ester, or nitrogen, air, or carbon dioxide. It is also possible to use blowing agent mixtures. It is preferable to use butane as blowing agent—the material used in practice often being an industrial mixture of n- and isobutane—and to use nitrogen as co-blowing agent.

By virtue of the different solubilities of the blowing agents in the polyesters of the invention it is possible, via the selection of the blowing agent and the quantity used of the blowing agent, to influence the properties of the expanded foam beads, in particular the bulk density, the type of cell, and the crystallinity. These bead properties in turn influence the subsequent processability and the properties of the moldings resulting from processing. Particularly hydrocarbons such as butane differ significantly in terms of solubility in the polyesters of the invention compared to carbon dioxide.

It is preferable to use, as blowing agent, n-butane, isobutane, the abovementioned industrial mixture of the two butanes, carbon dioxide, and/or nitrogen, and it is particularly preferable to use n-butane or carbon dioxide. Carbon dioxide and/or nitrogen, preferably nitrogen, can, as mentioned above, be used as co-blowing agents.

Again, the quantity used of the at least one blowing agent is generally from 1% to 50% by weight, preferably from 1% to 30% by weight, particularly preferably from 5% to 25% by weight, based in each case on the pellets. This quantity of blowing agent in particular ensures good impregnation quality. The blowing agent can be introduced all at once or in portions. A co-blowing agent, for example nitrogen, is typically supplied at an (onset) temperature below the first melt peak in the DSC of the polyester of the invention, for example at 50° C. This is done by injecting the co-blowing agent to increase the internal pressure in the impregnation reactor preferably by 2-15 bar.

When butane or carbon dioxide is used as blowing agent, nitrogen as co-blowing agent can especially increase the cell density and reduce the resulting bulk density.

The reactor contents are generally heated at a high heating rate, i.e. >1.5° C./min, preferably >2.0° C./min, to a suspension temperature of from 90 to 110° C. The addition of blowing agent here can take place prior to, during, or after the heating of the reactor content, preferably prior to the heating. However, the blowing agent should be added prior to commencement of the retention time.

The actual impregnation temperature, i.e. the temperature at which a sudden depressurization takes place in the step (iii), should be in the vicinity of the softening point of the copolyester, for example from 30° C. below to 20° C. above the melting point (crystallite melting point) of the polyester. Preferred impregnation temperatures for the copolyesters of the invention are from 100 to 130° C., in particular from 100 to 120° C.

The resultant pressure (impregnation pressure) in the sealed reactor depends on the quantity and nature of the blowing agent, and also on the temperature, and is generally a gauge pressure of from 10 to 40 bar.

By virtue of the elevated temperature prevailing under the impregnation conditions, and the gauge pressure, blowing agent diffuses into the pellets of the copolyesters of the invention. This takes place at a rate that varies with the nature and concentration of the blowing agent, the particle weight, the selected phase ratio, and also the fill level of the tank. However, foam beads with the desired property profile can be obtained in step (iii) of the process only if there is complete impregnation.

The selected impregnation parameters of particle weight, suspension medium, type and concentration of the blowing agent, phase ratio, fill level of the tank, and IMT influence, within certain limits, the subsequent crystallinity of the foam beads and thus the other physical properties of said beads, and also the properties thereof during processing to give the molding.

We have now found that the essential parameter for establishing the crystallinity of the foam beads is a retarded heating rate 5° C. before reaching the IMT. In particular, an average heating rate that has proven to be advantageous 5° C. before reaching the IMT is from 0.05 to 1.5° C./min, preferably from 0.08 to 0.5° C./min, and particularly preferably from 0.1 to 0.24° C./min.

The average heating rate in the region of the IMT corresponds in practice to a retention time of the suspension, during the impregnation procedure, in a temperature range from 5° C. below the IMT to 2° C. above the IMT for a period of from 3 to 100 minutes, preferably from 10 to 60 minutes, and with particular preference from 21 to 50 minutes.

With high average heating rates (>1.5° C./min) and retention times below 3 minutes it is not possible even at high blowing agent concentrations or via an increase in the IMT, to achieve either low bulk densities (<300 kg/m$^3$) or acceptable impregnation qualities. There is sometimes a drastic deterioration in the homogeneity of the product (narrow bead size distribution). Average heating rates that are even lower or retention times that are even longer, above 100 minutes, do not provide any significant improvement, and are not economically justifiable.

The aim of the process of the invention is a narrow particle size distribution within one batch and complete expansion of the starting pellets to give foam beads. Nevertheless, it is typically necessary to separate off the batch of unfoamed or incompletely foamed material with a sieve of mesh size M=PD*1.25 where PD in the case of underwater pelletization corresponds to the mean bead diameter, and in the case of pelletized strands to the longer diameter of the round or ellipsoidal cutting surface. In the case of inadequate impregnation quality the sieve waste is over 15%, i.e. the good fraction (yield) is <95%. In the case of acceptable homogeneity the sieve waste is between 5% and 15%, and in the case of good homogeneity the sieve waste is <5%, i.e. the yield is more than 95%. The beads should also be foamed to give a homogeneous cell structure. When cell structure is inadequate, compact material is present in the center, and also sometimes at the periphery, of the foam bead or, over the entire volume of the foam bead, there are cells (even if just a few) present with cell walls of thickness >500 μm.

Acceptable cell structure meant complete impregnation of the polymer beads (cellular structure over the entire volume of the foam bead without compact core and, the thickness of the cell walls in the center is from 150 μm to 500 μm). A layer of thickness <500 μm at the external shell of the foam bead is finely cellular to compact.

When cell structure is good, the thickness of the cell walls in the center is smaller than 100 μm. A layer of thickness <500 μm at the external shell of the foam bead is finely cellular to compact.

According to the choice of impregnation parameters (for example an unfavorable combination of blowing agent concentration, impregnation temperature and retention time), the beads may have a good cell structure but nevertheless have a totally collapsed bead surface at the end of the inventive step. This occurs especially when quenching is omitted. The aim is the production of plump foam beads with a smooth and shiny bead surface.

At the end of step (ii) of the invention, pellets laden with blowing agent are obtained in suspension.

Step (iii) of the process of the invention comprises the depressurization and cooling of the suspension obtained in step (ii) via contact with a suitable coolant (quench process).

In step (iii) of the process of the invention, the suspension is usually depressurized via a suitable device. It is preferable that the suspension initially leaves the impregnation tank via a valve. In order to reduce turbulence of the depressurized jet and in order to develop laminar flow, said jet can then preferably be conducted through a short section of a depressurization pipe, the end of which bears a perforated plate. The depressurization time can be controlled via length and diameter of the depressurization pipe, and also the perforated plate diameter.

The suspension can be depressurized immediately to atmospheric pressure, for example 1013 mbar. However, it is preferable to depressurize into an intermediate vessel, the pressure in which is adequate for the foaming of the blowing-agent-loaded pellets, but can be above atmospheric pressure. By way of example, depressurization is carried out to a gauge pressure of from 0.5 to 5 bar, in particular of from 1 to 3 bar. During the depressurization, the impregnation pressure that has arisen (pressure that has arisen as a result of the selected impregnation parameters prior to the depressurization step) in the impregnation vessel can be kept constant, by subsequent addition of pressurized blowing agent or inert gas, for example nitrogen. However, it is also possible and often advantageous, a few seconds prior to the depressurization, to increase the existing impregnation pressure further by injecting nitrogen (ejection pressure), generally up to 40 bar, and then likewise to keep said ejection pressure constant. The increased ejection pressure leads in particular to lower bulk densities and to greater homogeneity of product (narrower particle size distribution).

During the depressurization, the blowing agent comprised in the pellets expands, in such a way that expanded foam beads are obtained. After the depressurization, a suspension of expanded foam beads is thus obtained.

During the depressurization step, the suspension can be contacted with a suitable liquid coolant (quenching). The coolant is generally metered in via one or more nozzles arranged in a ring shortly downstream of the corresponding depressurization device. This leads to foam beads having a thicker skin and, as a result, to a smoother and shinier bead surface compared to a depressurization step without quenching. Such products lead to advantages in the later processing to give moldings and in the resulting moldings (smoother, shinier molding surface). A corresponding process, for example for polypropylene bead foams, is described in EP 2336225. The coolant used is preferably water having a temperature between 5° C. and 50° C. The ratio of the amount of coolant to the amount of the suspension medium used is at least between 0.3 and 20 and preferably between 0.6 and 10.

The expanded foam beads can be isolated from the suspension in the usual way, for example via filtration, for example using a mesh sieve or static sieve, or by way of a continuously operating centrifuge.

Residual adherent suspension medium and/or residual adherent suspension aid can moreover optionally be removed before or after the isolation process. The expanded foam beads can then be washed and dried.

In a further step, at least unfoamed beads are separated off with suitable sieves.

The bulk density of the expanded foam beads obtained after step (iii) is usually from 5 to 300 kg/m$^3$, preferably from 30 to 200 kg/m$^3$, and particularly preferably from 60 to 120 kg/m$^3$.

In another embodiment of the process of the invention, the expanded foam beads (expanded foam beads S) obtained in step (iii) are further foamed in order to obtain expanded foam beads N of lower bulk density. This step is also termed "afterfoaming". This additional step is in particular used in order to utilize the transport and storage advantage of foam beads with high bulk densities. Production of a desired low bulk density can then be delayed until it is required.

Processes for further foaming of the expanded foam beads S obtained in step (iii) of the process of the invention are known to the person skilled in the art and are described by way of example in EP 1 533 335.

The foam beads S can optionally be provided with an anticaking agent prior to afterfoaming. In one preferred embodiment this is achieved via coating. Typical anticaking agents are likewise described in EP 1 533 335.

The ratio of bulk density of the expanded foam beads S to the bulk density of the afterfoamed expanded foam beads N is known as the expansion factor, and is particularly preferably from 1.2 to 3.

The expanded foam beads S or N produced in the invention are predominantly closed-cell, the proportion by volume of closed cells being determined in accordance with DIN EN ISO 4590 of Aug. 1, 2003, and they generally have a cell density (number of cells/area) of 1 to 750 cells/mm$^2$, preferably 2 to 500 cells/mm$^2$, in particular 5 to 200 cells/mm$^2$, and with particular preference 10 to 100 cells/mm$^2$.

The expanded foam beads S or N are generally at least approximately spherical. The diameter depends on the chosen particle weight of the starting pellets and on the bulk density produced.

However, the diameter of the foam beads is usually from 1 to 30 mm, preferably 3.5 to 25 mm, and in particular 4.5 to 25 mm. In the case of foam beads that are not spherical, being by way of example elongate, cylindrical, or ellipsoidal, diameter means the longest dimension.

The crystalline structure of the expanded foam beads can be characterized by differential scanning calorimetry (DSC) in accordance with ISO 11357-3 (German version of 04.01.2013).

For this, from 3 to 5 mg of the foam beads are heated at temperatures from 20° C. to 200° C. at a heating rate of 20° C./min, and the resultant heat flux is determined in the 1st run.

Figure 1:
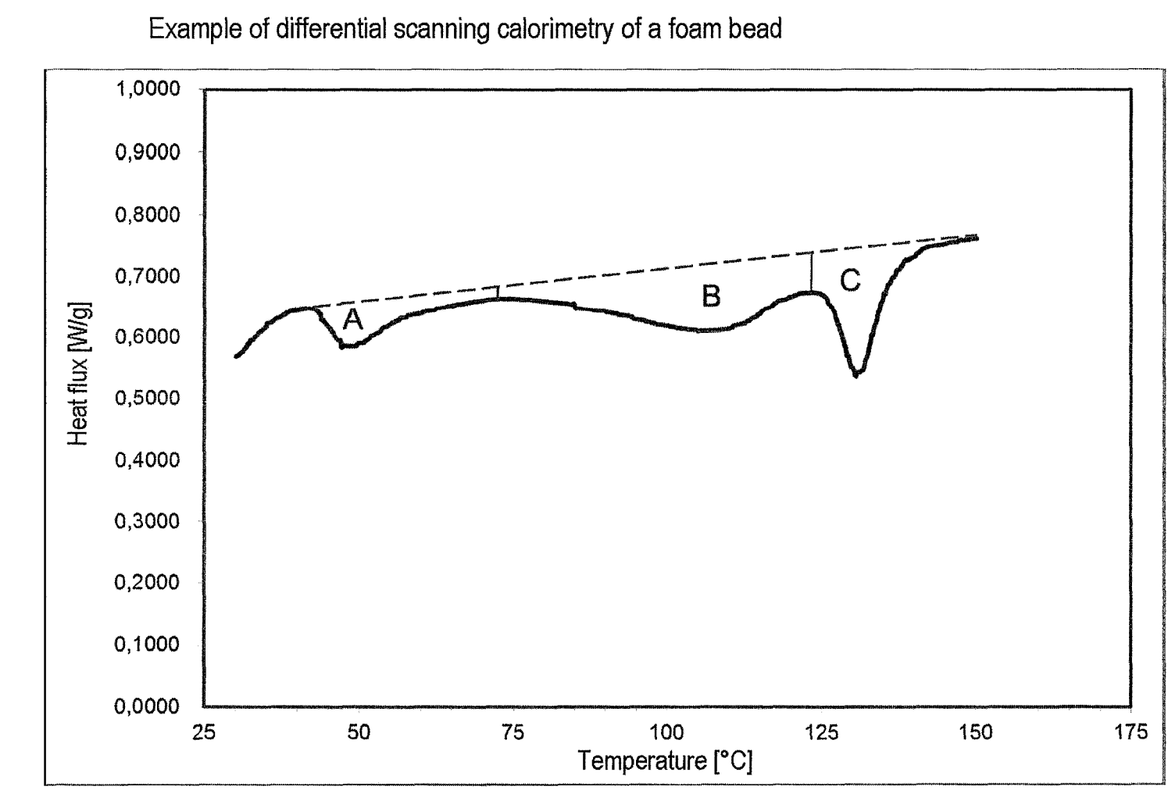
FIG. 1 is a representative DSC plot of inventive foam beads.

At least two and often up to four endothermic peaks can in each case be detected in the 1st DSC run (see FIG. 1 for illustration). The peak maximum of the peak appearing at highest temperature here is always above the temperature of the melting point of the polyester used and above the melting points when polyester mixtures are used. The peak maximum of at least one peak of the at least two endothermic peaks present is moreover below the temperature of the melting point of the polyester used (the melting points of the polymer mixture used).

It has now been found that the foam beads obtainable by the process of the invention always exhibit, in DSC, this double or multiple peak structure. It has moreover been found that the foam beads have good processability—in particular good fusion properties—when the sum of the endothermic peaks (i.e. in FIG. 1 the sum of the quantities of heat corresponding to the areas A, B, and C) gives a quantity of heat of at least 5 J/g. The improved fusion can give moldings with improved mechanical properties, e.g. in the tensile test.

The present application also provides expanded foam beads obtainable via the process of the invention. These differ from the foam beads known from WO00/068303 in that in DSC in accordance with ISO 11357-3 (German version of Apr. 1, 2013) they exhibit a double or multiple peak structure. The higher crystallinity of the foam beads of the invention is clear from the quantity of endothermic heat measured (greater than or equal to 5 J/g) in DSC in accordance with ISO 11357-3 (German version of Apr. 1, 2013). Exclusively endothermic heat fluxes occur.

The foam beads S or N can be provided with an antistatic agent. In one preferred embodiment, this is achieved via coating.

The expanded foam beads S or N produced in the invention can be used to produce foamed moldings (foams) by processes known to the person skilled in the art.

By way of example, the expanded foam beads S or N can be adhesive-bonded to one another with the aid of an adhesive in a continuous or batch process, for example using polyurethane adhesives known from the literature.

However, it is preferable that the expanded foam beads made of polyester are fused to one another in a closed mold with exposure to heat. For this, the foam beads are charged to the mold, and once the mold has been closed steam or hot air is introduced, causing further expansion of the foam beads and fusion of these to one another to give the foam, preferably of density in the range from 8 to 300 kg/m$^3$. The foams can be semifinished products, such as sheets, profiles, or webs, or finished moldings of simple or complicated geometry. The nomenclature accordingly includes foam, semifinished foam products, and foam moldings.

The present invention therefore also provides a foam comprising expanded foam beads S or N, which can be produced, preferably which has been produced, via the process of the invention.

The present invention further provides a molding which can be produced, preferably which has been produced, from the expanded foam beads S or N that can be produced in the invention.

The present invention also provides a molding comprising expanded foam beads S or N which can be produced via the process of the invention.

The present invention also provides a process for the production of a molding, comprising at least the following steps:

1. production of expanded foam beads S or N in accordance with the abovementioned process of the invention, and
2. foaming of the foam beads S or N in an appropriate mold in order to obtain a molding.

In this process, expanded foam beads S or N are first produced according to the steps (i) to (iii) as described above. The expanded foam beads S can optionally be used to produce the foam beads N via afterfoaming.

Step (2.) comprises the foaming of the expanded foam beads S or N in an appropriate mold in order to obtain a molding.

In one preferred embodiment, step (2.) is carried out by fusing expanded foam beads S or N to one another in a closed mold with exposure to heat. For this, the foam beads are preferably charged to the mold and, after the mold has been closed, steam or hot air is introduced, causing further expansion of the foam beads and fusion of these to one another to give the molding, preferably of density in the range from 8 to 350 kg/m³. The ratio of the density of the molding to the bulk density of the expanded foam beads here is generally >1.1.

In one very particularly preferred embodiment, the moldings are obtained by processes known to the person skilled in the art, for example pressure-fill processes or compression processes, the positive mold process or crack process, or after prior pressurization. Corresponding processes are disclosed in DE-A 25 42 453 and EP-A-0 072 499.

The present invention also provides the use of the expanded foam beads which can be produced in the invention and have a mean particle weight of 10 to 60 mg/bead for the production of moldings.

We have now found that moldings formed from expanded foam beads having a mean particle weight of 10 to 60 mg/bead have a high rebound in accordance with DIN EN ISO 1856 (50%, 22 h, 23° C.) of Jan. 1, 2008. Rebound is much higher than that of moldings which have been produced from expanded foam beads known from the literature (JP 2004 143269).

These moldings additionally exhibit good tensile strength values and good compressive strength values, adequately low compression set, and also acceptable resistance to temperature change, and they can therefore be used for appropriate applications in the sports and leisure sector, in the packaging industry or automobile industry, or else for technical applications. More particularly, these moldings, because of the high rebound, are suitable for coverings for stall floors, for example cow mattresses, or sports floors or, for example, shoe soles for sport shoes.

The following examples illustrate, but do not restrict, the invention:

EXAMPLES

I. Polyesters used in the Form of Pellets:
The aliphatic-aromatic polyesters listed in table 1 were used in the inventive examples.
Materials used:
Polyester A:
The polyester was produced by mixing 87.3 kg of dimethyl terephthalate, 80.3 kg of adipic acid, 117 kg of 1,4-butanediol, and 0.2 kg of glycerol together with 0.028 kg of tetrabutyl orthotitanate (TBOT), the molar ratio between alcohol component and acid components here being 1.30. The reaction mixture was heated to a temperature of 180° C., and reacted for 6 h at this temperature. The temperature was then increased to 240° C., and the excess dihydroxy compound was removed by distillation in vacuo over a period of 3 h. 0.9 kg of hexamethylene diisocyanate was then slowly metered into the mixture at 240° C. within 1 h.

The melting point of the resultant polyester A is 119° C., its molar mass (Mn) is 23 000 g/mol, and its MVR (at 190° C.; 2.16 kg) is 3.3 g/10 min.

This polyester A was pelletized in an extruder with underwater pelletization (UWP) to give beads of weight (arithmetic mean) 40 mg (A1) and 10 mg (A2).
Polyester B:
Polyester A was mixed with 0.1% by weight, based on the polyester, of talc powder (Micro Talc IT Extra) from Mondo Minerals B.V., and compounded in an extruder, and a UWP was produced with an average particle weight (arithmetic mean) of 10 mg.
Polyester C:
Production of polyester C was the same as that of polyester A except with 0.5 kg of hexamethylene diisocyanate.

The MVR (at 190° C.; 2.16 kg) of the resultant polyester C was 8.8 g/10 min.

TABLE 1

| Polyester | Pellet type | Mean pellet weight (range) [mg] | Melting point (DSC) [° C.] | MVR ISO 1133 (190° C.; 2.16 kg) [cm³/10 min] | Shore hardness DIN EN ISO 868 |
|---|---|---|---|---|---|
| A1 | UWP | 40 (38-43) | 115-125 | 2.5-5.0 | D32 |
| A2 | UWP | 10 (9-11) | 115-125 | 2.5-5.0 | D32 |
| B | UWP | 10 (9-11) | 115-125 | 2.5-5.0 | D32 |
| C | UWP | 40 (38-43) | 115-125 | 8.3-13.8 | D32 |

II. General Experimental Description of Steps (i) to (iii) of the Process of the Invention:
The experiments were carried out with a tank fill level of 80%.

Examples 1-13 AND C1-C2 WITH PHASE RATIO 0.34

100 parts by weight (corresponding to 26.9% by weight, based on the entire suspension without blowing agent) of the polyester pellets, 265 parts by weight (corresponding to 71.3% by weight, based on the entire suspension without blowing agent) of water, 6.7 parts by weight of calcium carbonate, 0.13 part by weight of a surface-active substance, and the corresponding quantity of blowing agent (based on the quantity of pellets used) were heated to impregnation temperature (IMT), with stirring. At a temperature of 50° C., in the liquid phase, nitrogen was then additionally injected as part of the co-blowing agent, and the internal pressure was adjusted to a previously defined pressure (e.g. 8 bar or 14 bar). The exact final pressure established with nitrogen in the gas phase can be found in table 2. No pressure figure means that no additional nitrogen was injected in this experiment.

On reaching IMT and the corresponding IMP (impregnation pressure), and after compliance with the retention time, depressurization is then carried out by way of a depressurization device and, during this time, quenching is effected with a total of 350 parts by weight of cold water at 26° C. as coolant via three nozzles arranged in a ring.

Example 14 with Phase Ratio 0.74

100 parts by weight (corresponding to 41.2% by weight, based on the entire suspension without blowing agent) of the polyester pellets, 136 parts by weight (corresponding to 56.0% by weight, based on the entire suspension without blowing agent) of water, 6.7 parts by weight of calcium carbonate, 0.13 part by weight of a surface-active substance, and the corresponding quantity of blowing agent (based on the quantity of pellets used) were heated to impregnation temperature (IMT), with stirring. Nitrogen is also injected into the liquid phase at 50° C., and the internal pressure is adjusted to the previously defined pressure of 8 bar.

On reaching IMT and the corresponding IMP, and after compliance with the retention time, depressurization is then carried out by way of a depressurization device and, during this time, quenching is effected with a total of 350 parts by weight of cold water at 26° C. as coolant via three nozzles arranged in a ring.

Comparative Example 3

Comparative example 3 was carried out like examples 1 to 13 and C1-C2, except that operation was effected without cooling by means of added cold water (quenching).

Table 2 lists the exact production parameters of inventive examples 1 to 14, and also of comparative examples C1-C3, and also the properties of the resultant foam beads S.

III. Production of the Moldings:

The moldings were produced in a commercially available EPP molding machine (K68 from Kurtz GmbH). Cuboidal test blocks of various thicknesses were produced with molds of dimensions 315×210×25 mm and 300*200*60 mm. The moldings of thickness 60 mm were produced by the pressure-fill process; the moldings of thickness 25 mm were produced by the crack-fill process.

After production, the moldings were stored at 60° C. for 16 h.

Table 3 lists the results of tests on the moldings.

Test Methods:

Bulk Density:

The determination was effected in accordance with DIN EN ISO 60: 2000-1. This involved introducing the foam beads with the aid of a funnel having fixed geometry (completely filled with bulk material) into a measuring cylinder of known volume, stripping off the excess bulk material from the measuring cylinder with a straight-edged rod and determining the contents of the measuring cylinder by weighing.

The funnel used is 40 cm high and had an opening angle of 35° and an outlet of diameter 50 mm. The measuring cylinder had an internal diameter of 188 mm and a volume of 10 l.

The bulk density (SD) was calculated from the mass of the bed [kg]/0.01 [m$^3$].

The bulk density reported was the average from 3 measurements in kg/m$^3$.

DSC:

Method in accordance with ISO 11357-3 (German version of Jan. 4, 2013) using Q100 DSC from TA Instruments.

To determine the melting point of the polyester used in pellet form, from 3 to 5 mg were heated in a 1st run at temperatures from 20° C. to 200° C. at a heating rate of 20° C./min, and then cooled to 20° C. at 10° C./min, and then a further heating cycle (2nd run) was carried out with a heating rate of 10° C./min.

The temperature of the peak maximum in the 2nd run has been stated as melting point.

To characterize the crystalline structure of the expanded foam beads, 3 to 5 mg are heated at temperatures from 20° C. to 200° C. at a heating rate of 20° C./min, and the resulting heat flux is determined.

Impregnation Quality

Impregnation quality was determined in accordance with a scale of grades:
- unsatisfactory
- ○ acceptable
- + good The impregnation quality was assessed by the following three criteria:
homogeneity of a batch (particle size distribution PSD)
quality of the bead surface
cell structure of the beads.

Each criterion is classified according to the above scale of grades. The overall grade for the impregnation quality was the worst individual grade.

Criterion of Homogeneity of a Batch:

The batch of foam beads was from unfoamed or incompletely foamed material with a sieve of mesh size M=PD*1.25 where PD in the case of underwater pelletization corresponded to the mean bead diameter, and in the case of pelletized strands to the longer diameter of the round or ellipsoidal cutting surface. In the case of inadequate homogeneity, the sieve waste was more than 15%, i.e. the good fraction (yield) was <85%. In the case of acceptable homogeneity the sieve waste was between 5% and 15%, and in the case of good homogeneity the sieve waste was <5%, i.e. the yield was more than 95%.

Criterion of Quality of the Bead Surface:

In the case of an inadequate bead surface, the bead had completely collapsed. In the case of an acceptable bead surface, the bead surface was rough and matt. In the case of a good bead surface, the bead was plump and the surface was smooth and shiny.

Criterion of Cell Structure of the Beads:

In the case of an inadequate cell structure, compact material was present in the center, but also sometimes at the periphery, of the foam bead or, over the entire volume of the foam bead, there were cells (even if just a few) present with cell walls of thickness >500 µm.

Acceptable cell structure meant complete impregnation of the polymer beads (cellular structure over the entire volume of the foam bead without compact core, and the thickness of the cell walls in the center was from 150 µm to 500 µm). A layer of thickness<500 µm at the external shell of the foam bead was finely cellular to compact.

When cell structure was good, the thickness of the cell walls in the center was smaller than 100 µm. A layer of thickness<500 µm at the external shell of the foam bead is finely cellular to compact.

Closed-cell Factor

The volume proportion of closed cells was determined by a method based on DIN EN ISO 4590 of Jan. 8, 2003.

Average Cell Density

The foam structure was assessed via optical image analysis using a PORE!SCAN Advanced Plus from Goldlucke Ingenieurleistungen. For this, in each case 10 foam beads were halved, and in each case one cut surface was subjected to measurement. In the case of foam beads that were not spherical, being for example elongate, cylindrical, or ellipsoidal, the division took place in the direction of the longest dimension.

The average cell density is the ratio of the number of cells on the cut surface to the area of the cut surface, and is stated in 1/mm$^2$.

The value is allocated to a classification system:

| Classification | average cell density [1/mm$^2$] |
|---|---|
| F fine-celled structure | >100 |
| N normal cell structure | 10-100 |
| G coarse-celled structure | <10 |

Degree of Compaction DC

The degree of compaction DC is the ratio of molding density (M density) to bulk density (BD). DC=M density [kg/m$^3$]/BD [kg/m$^3$].

Compression Set (CS)

Compression set was determined by a method based on DIN EN ISO 1856, Method C. After removal of the test sample from the test device and recovery of the test sample, 24 h were allowed to elapse before the thickness was measured.

Heat-aging

The test samples (180×60×40 mm) were placed in the oven preheated to the appropriate aging temperature (100° C.) and are aged at this temperature for 240 h. The surfaces/edges were assessed as follows:

temperature under ambient indoor conditions, and dimensional change is then measured with a caliper gauge.

The dimensional change (length, width, height) is calculated from the following formula:

$$DIMC = [(Lo - L1)/Lo] \times 100$$

DIMC = dimensional change in %
Lo = original dimension
L1 = dimension after heat-aging Heat resistance was acceptable (OK) if surfaces and edges exhibit no changes and the average dimensional change over length, width, and height was <10%.

TABLE 2

| Ex. | Polyester | Blowing agent | Blowing agent concentration [%] | $N_2$ injection at 50° C. to internal pressure [bar] | Retention time (range from IMT −5° C. to IMT +2° C.) | IMT [° C.] | SD [kg/m³] | Impregnation quality [grade] | Closed-cell factor [%] | Mean cell density Classification | DSC Σ heat flux |
|---|---|---|---|---|---|---|---|---|---|---|---|
| 1 | A1 | butane | 24 | 8 | 21 | 110 | 90 | + | >95 | N | 11.6 |
| 2 | A1 | butane | 24 | 8 | 33 | 109 | 75 | + | >95 | N | 14.7 |
| 3 | A1 | butane | 24 | 14 | 36 | 110 | 66 | + | >95 | N | 18.5 |
| 4 | A1 | butane | 18 | 8 | 36 | 110 | 70 | + | >95 | N | 10.1 |
| 5 | A1 | butane | 12 | 8 | 28 | 110 | 75 | + | >95 | N | 14.3 |
| 6 | A1 | $CO_2$ | 10 | — | 11 | 111 | 164 | + | >95 | N | 12.5 |
| 7 | A1 | $CO_2$ | 10 | 5 | 7 | 111 | 122 | + | >95 | N | 13.0 |
| 8 | A2 | butane | 24 | 8 | 16 | 108 | 90 | + | >95 | N | 9.2 |
| 9 | A2 | butane | 24 | 8 | 21 | 109 | 55 | + | >95 | N | 11.7 |
| 10 | B | butane | 24 | 8 | 19 | 105 | 90 | + | >95 | F | 14.4 |
| 11 | B | butane | 24 | 8 | 17 | 108 | 50 | + | >95 | F | 11.9 |
| 12 | C | butane | 24 | 8 | 38 | 110 | 68 | + | >95 | N | 11.1 |
| 13 | B | butane | 24 | — | 18 | 105 | 96 | + | >95 | F | 9.8 |
| 14 | A1 | butane | 24 | 8 | 39 | 110 | 66 | + | >95 | G | 10.9 |
| C1 | A1 | butane | 24 | 8 | 3 | 110 | >300 | − | n.a | n.a. | n.a. |
| C2 | A2 | butane | 24 | 8 | 3 | 108 | >300 | − | n.a. | n.a. | n.a. |
| C3 | A1 | butane | 24 | 8 | 33 | 109 | 67 | − | >95 | N | 11.3 | n.a. no or barely any expansion of the pellet units; testing was inapplicable or pointless

TABLE 3

| Molding | Foam beads (table 2) | DC | Molding density DIN EN ISO 845 (Oct. 1, 2009) [kg/m³] | Tensile strength DIN EN ISO 1798 (Apr. 1, 2008) [kPa] | Tensile strain at break DIN EN ISO 1798 (Apr. 1, 2008) [%] | Rebound resilience DIN EN ISO 8307 (Mar. 1, 2008) [%] | Compression set DIN EN ISO 1856 (50%, 22 h, 23° C.) (Jan. 1, 2008) [%] | Heat-aging (240 h/100° C.) |
|---|---|---|---|---|---|---|---|---|
| FT-1 | Example 1 | 2.4 | 215 | 950 | 80 | 62 | — | OK |
| FT-2 | Example 1 | 1.8 | 160 | 645 | 110 | 63 | 6.9 | OK |
| FT-3 | Example 3 | 1.4 | 107 | 350 | 140 | 64 | 12.6 | OK |

The surface and edge of the test samples was assessed every 24 h during the aging time in accordance with a scale of grades. For this the test samples were briefly removed from the oven.

| Evaluation | Grade |
|---|---|
| no change | 1 |
| edge abrasion | 2 |
| edge disintegration | 3 |
| edge disintegration plus surface damage to depth 0 to 5 mm | 4 |
| edge disintegration plus surface damage to depth 5 to 10 mm | 5 |
| Sample disintegrates under light pressure from the thumb | 6 |

After the heat-aging has ended, the test samples were carefully removed from the oven and stored for 24 h at room

The invention claimed is:

1. A process for producing expanded foam beads from pellets comprising at least one biodegradable polyester consisting essentially of:

A1) 40 to 60 mol %, based on components A1) to A2), of a succinic acid, adipic acid, or sebacic acid or a mixture thereof, A2) 40 to 60 mol %, based on components A1) to A2), of a terephthalic acid, B) 98.5 to 100 mol %, based on components A1) to A2), of 1,4-butanediol or 1,3-propanediol or a mixture thereof; and C) 0.05% to 1.5% by weight, based on components A1), A2) and B, of one or more compounds selected from the group consisting of:

C1) a compound having at least three groups capable of ester formation,

C2) a di- or polyfunctional isocyanate, and

C3) a di- or polyfunctional epoxide;

the process comprising the following steps:
- (i) providing a suspension comprising pellets having an arithmetic average bead weight of 10 to 60 mg/bead in an aqueous suspension medium,
- (ii) impregnating the pellets present in the suspension of step (i) with at least one physical blowing agent by heating the mixture to an impregnation temperature IMT, with stirring, to obtain pellets laden with blowing agent in suspension, and
- (iii) depressurizing the suspension obtained in step (ii) and cooling the depressurized suspension with a liquid aqueous coolant, to obtain expanded foam beads, wherein the ratio of coolant to suspension medium is at least 0.3, wherein the at least one blowing agent is added in step i, or in step ii during the heating, or following the heating, and wherein in step (ii), after heating and after the addition of the at least one blowing agent, the suspension is maintained at a temperature in a range from IMT minus 5° C. to IMT plus 2° C. for 3 to 100 minutes.

2. The process according to claim 1, wherein the suspension, after heating, is maintained at a temperature in the range from IMT minus 5° C. and IMT plus 2° C. for 21 to 50 minutes, and the IMT is in the range from 100 to 120° C.

3. The process according to claim 1, wherein the at least one physical blowing agent is selected from the group consisting of n-butane, isobutane and $CO_2$ is used.

4. The process according to claim 1, further comprising adding 0.02%-0.2% by weight, based on the biodegradable polyester, of talc to the aqueous suspension medium.

5. The process according to claim 1, further comprising increasing gas pressure over the suspension by 2 to 15 bar in step ii by injecting nitrogen at an onset temperature below the melting point of the polyester, measured by differential scanning calorimetry in accordance with ISO 11357-3 of Apr. 1, 2013.

* * * * *